United States Patent
Tamegai

(10) Patent No.: US 7,924,540 B2
(45) Date of Patent: Apr. 12, 2011

(54) OVER-VOLTAGE PROTECTION CIRCUIT

(75) Inventor: Yoichi Tamegai, Kyoto (JP)

(73) Assignee: Rohm Co., Ltd. (JP)

( * ) Notice: Subject to any disclaimer, the term of this patent is extended or adjusted under 35 U.S.C. 154(b) by 239 days.

(21) Appl. No.: 12/251,961

(22) Filed: Oct. 15, 2008

(65) Prior Publication Data

US 2009/0097181 A1    Apr. 16, 2009

(30) Foreign Application Priority Data

Oct. 15, 2007  (JP) ................. 2007-268282

(51) Int. Cl.
*H02H 3/20* (2006.01)
*H02H 9/04* (2006.01)
*H01H 9/30* (2006.01)
*H01H 1/50* (2006.01)
*H01H 1/60* (2006.01)
*H01H 33/00* (2006.01)

(52) U.S. Cl. .............. 361/91.5; 361/91.1; 361/91.7; 307/127; 307/138

(58) Field of Classification Search .......... 361/91.1, 361/91.5, 91.7; 320/165; 307/127, 138
See application file for complete search history.

(56) References Cited

U.S. PATENT DOCUMENTS

| 5,726,505 A | * | 3/1998 | Yamada et al. | .......... 307/127 |
| 7,751,157 B2 | * | 7/2010 | Migliavacca | .......... 361/18 |
| 2009/0091872 A1 | * | 4/2009 | Ueda | .......... 361/91.1 |

FOREIGN PATENT DOCUMENTS

JP    9-219935    8/1997

* cited by examiner

*Primary Examiner* — Dharti H Patel
(74) *Attorney, Agent, or Firm* — Cantor Colburn LLP

(57) ABSTRACT

A main transistor and a reverse current prevention transistor are provided in series between an input terminal and an output terminal. An input diode is provided between a connection point of the reverse current prevention transistor and the main transistor and a reference voltage terminal in such a direction that the anode becomes the reference voltage terminal side. A control unit controls the gate voltage of the main transistor according to a DC voltage. The reverse current prevention transistor is arranged in such a direction that the anode of its body diode becomes the input terminal side. The reverse current prevention transistor is biased to be turned on in a normal state that the input terminal becomes high potential and the reference voltage terminal becomes low potential.

11 Claims, 2 Drawing Sheets

OVER-VOLTAGE PROTECTION CIRCUIT

BACKGROUND OF THE INVENTION

1. Field of the Invention

The present invention relates to an over-voltage protection circuit that protects a circuit from an over-voltage.

2. Description of the Related Art

Circuit elements used for a semiconductor integrated circuit ("IC") may lose their normal functions when being applied with a voltage exceeding a breakdown voltage. Electronic devices operated by using external power supply, especially devices likely to be operated using power supply for emergency using batteries or low quality USB (Universal Serial Bus) power supply, have possibility to be applied with a high voltage deviating from the rated voltage. Therefore, there is a need of an over-voltage protection circuit for protecting a circuit element from an over voltage.

[Patent Document 1] Japanese Patent Application (Laid Open) No. H9-219935

The applicant has recognized the below problems from a review of an over-voltage protection circuit that has a voltage protection function by using a zener voltage at its input stage. In the over-voltage protection circuit, where a power supply voltage is externally applied across an input terminal and the reference voltage terminal is grounded, an input diode is configured so that the cathode becomes the input terminal side and the anode becomes the reference voltage terminal side. When an over-voltage is applied to the input terminal, the power supply voltage is clamped to the zener voltage, thus protecting the circuit elements.

However, a large voltage is applied across the input diode in the forward direction when the external power supply is connected to the protection circuit to have the opposite polarity, and this may damage the reliability of the input diode. For example, a large voltage may be applied across the input diode in the forward direction if a socket is connected in wrong direction when using a USB power supply from self-made personal computer, or if a polarity of battery is reversed when using an emergency power supply using the battery. Accordingly, there is a need to take this case into consideration with respect to circuit design.

SUMMARY OF THE INVENTION

The present invention has been made in consideration of the above problems and it is a general purpose of the present invention to provide an over-voltage protection circuit that has resistance to a reverse polarity input voltage.

According to an embodiment of the present invention, there is provided an over-voltage protection circuit. The over-voltage protection includes: an input terminal that receives a power supply voltage from the external; an output terminal that outputs the power supply voltage to the external; a reference voltage terminal that receives a reference voltage; a reverse current prevention transistor and a main transistor provided in series between the input terminal and the output terminal; an input diode provided between a connection point of the reverse current prevention transistor and the main transistor and the reference voltage terminal in such a direction that the cathode becomes the main transistor side; and a control unit that controls the voltage applied to a control terminal of the main transistor according to the power supply voltage. The reverse current prevention transistor is arranged in such a direction that the anode of its body diode becomes the input terminal side. Furthermore, the reverse current prevention transistor is biased to be turned on in a normal state that the input terminal becomes high potential and the reference voltage terminal becomes low potential and to be turned off in a reverse polarity state that the input terminal becomes low potential and the reference voltage terminal becomes high potential.

According to this embodiment, the flow of a large current across the input diode may be suppressed since the reverse current prevention transistor is turned off when an external voltage is applied with a reverse polarity in such a direction that the input terminal side becomes low potential and the reference voltage terminal side becomes high potential and the electric current flowing from the reference voltage terminal toward the input terminal is interrupted by the body diode.

The reverse current prevention transistor may be a P-channel MOSFET (Metal Oxide Semiconductor Field Effect Transistor) that has a control terminal connected to the reference voltage terminal, a first end connected to the input terminal, a second end connected to one end of the main transistor, and a back gate connected to the second end.

In this case, the reverse current prevention transistor may be automatically turned off in the state that an external voltage is applied with a reverse polarity, i.e. In such a direction that the input terminal side becomes low potential and the reference voltage terminal side becomes high potential, and the reverse current prevention transistor may be automatically turned on when the external voltage is applied with a normal polarity.

The reverse current prevention transistor may be an N-channel MOSFET that has a first end connected to the input terminal, a second end connected to one end of the main transistor, and a back gate connected to the first end. The gate is applied with a bias voltage so that the reverse current prevention transistor is turned off when the external power supply is connected with a reverse polarity and turned on when the external power supply is connected with a normal polarity.

The over-voltage protection circuit may be monolithically integrated on a single semiconductor substrate. The term "monolithically integrated" includes a case where the overall components of the circuit are formed on the semiconductor substrate or a case where primary components of the circuit are monolithically integrated on the semiconductor substrate. Here, some resistors or capacitors may be provided on the exterior of the semiconductor substrate for adjustment of circuit constant.

According to another embodiment of the present invention, there is provided a power management circuit. The power management circuit includes the aforementioned over-voltage protection circuit and a charging circuit that electrically charges a rechargeable battery with a power supply voltage output from the output terminal of the over-voltage protection circuit.

According to still another embodiment of the present invention, there is provided an electronic device. The electronic device includes a rechargeable battery and the power management circuit that electrically charges the rechargeable battery with a power supply voltage from external power supply.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Throughout the specification, the phrase "member A is connected to member B" includes a case where member A is physically connected to member B directly or indirectly via another member that does not affect the electrical connection between the two members A and B.

Similarly, the phrase "member C is provided between member A and member B" does not only include a case where member A and member C or member B and member C are directly connected to each other but also a case where member A and member C or member B and member C are indirectly connected to each other via another member that does not affect the electrical connection therebetween.

Figure 1:
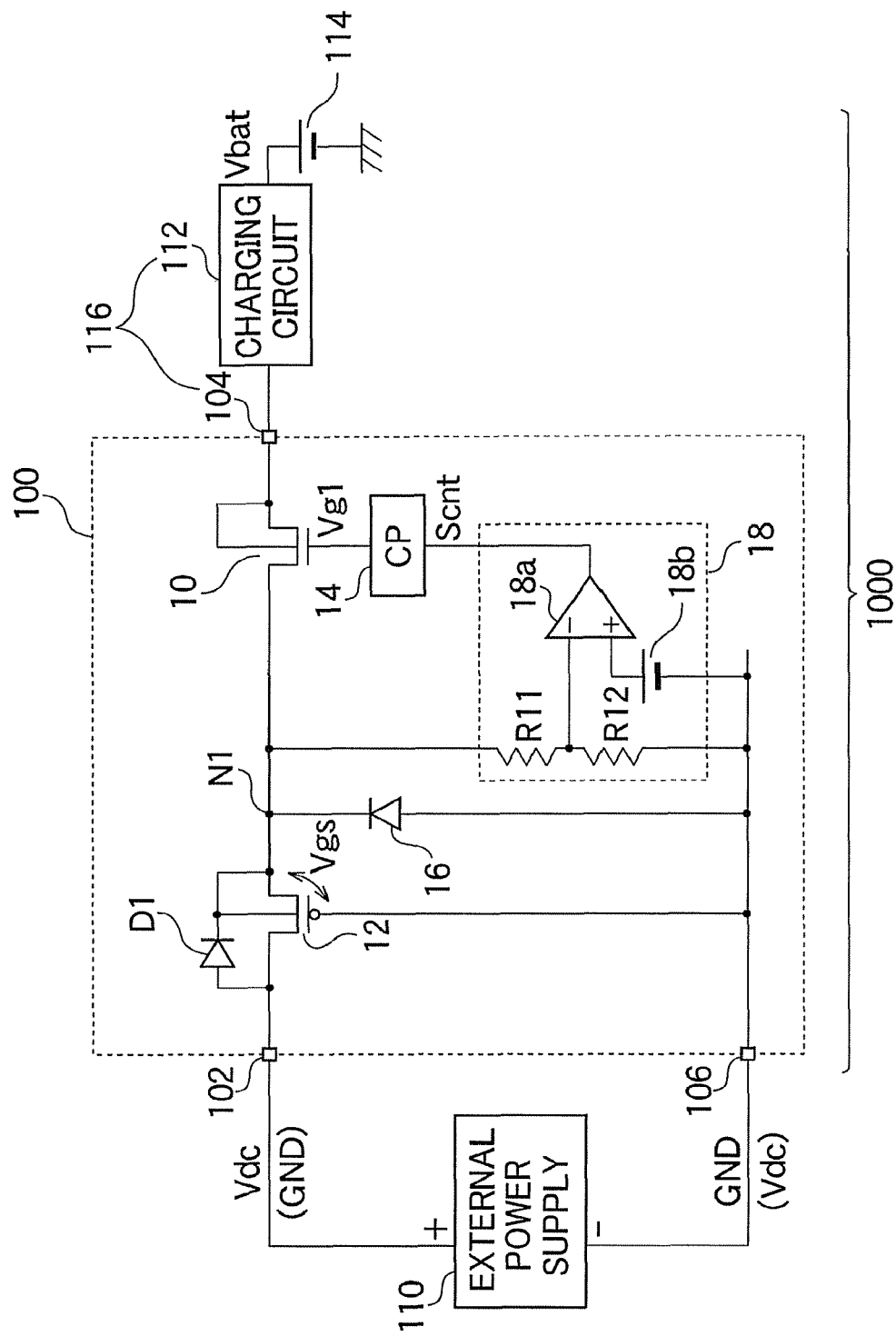
FIG. 1 is a circuit diagram illustrating a configuration of an over-voltage protection circuit and an electronic device using the over-voltage protection circuit according to an embodiment.

FIG. 1 is a circuit diagram illustrating the overall configuration of an over-voltage protection circuit 100 and an electronic device 1000 using the over-voltage protection circuit 100 according to an embodiment.

The electronic device 1000 is a battery-driven type information terminal device such as a mobile terminal, a PDA, and a laptop computer. The electronic device 1000 includes an over-voltage protection circuit 100, a charging circuit 112, and a battery 114. The electronic device 1000 may further include a CPU (Central Processing Unit) (not shown), a DSP (Digital Signal Processor) (not shown), a liquid crystal panel (not shown), a digital circuit (not shown), and an analogue circuit (not shown).

The battery 114 is a rechargeable battery such as a lithium ion battery or NiCd (Nickel Cadmium) battery and supplies a battery voltage Vbat to the other circuit blocks of the electronic device 1000.

External power supply 110 is connected to the electronic device 1000 and serves as power supply for emergency using an AC adapter that converts a commercial AC (alternating current) voltage into a DC (direct current) voltage, a DC/DC converter that drops the voltage from a vehicle-mounted battery, USB power supply, or any other batteries. The external power supply 110 supplies a DC power supply voltage Vdc to the battery 114.

The over-voltage protection circuit 100 includes an input terminal 102, an output terminal 104, and a reference voltage terminal 106, and is monolithically integrated on a single semiconductor substrate. The DC voltage Vdc is applied from the external power supply 110 to between the input terminal 102 and the reference voltage terminal 106 as a power supply voltage. In the normal state, the DC voltage Vdc is supplied in such a direction that the input terminal 102 side becomes high potential and the reference voltage terminal 106 side becomes low potential. In the over-voltage protection circuit 100, the voltage applied to the reference voltage terminal 106 acts as the reference voltage (ground voltage).

The over-voltage protection circuit 100 outputs the DC voltage Vdc from the output terminal 104 to a charging circuit 112 when the DC voltage Vdc applied to the input terminal 102 is lower than a predetermined threshold voltage Vth. On the contrary, the over-voltage protection circuit 100 stops supplying the DC voltage Vdc to the charging circuit 112 or drops and outputs the DC voltage Vdc when the DC voltage Vdc is higher than the threshold voltage Vth, i.e. an over-voltage is supplied. The over-voltage protection circuit 100 according to the embodiment interrupts voltage supply to the charging circuit 112 when Vdc>Vth.

The charging circuit 112 receives the DC voltage Vdc output from the over-voltage protection circuit 100 to electrically charge the battery 114. It should be noted that the circuit that may be connected to the output terminal 104 of the over-voltage protection circuit 100 is not limited to the charging circuit 112 and various circuits operated with a DC voltage supplied externally may be applicable.

Hereinafter, detailed descriptions of the over-voltage protection circuit 100 will be given. The over-voltage protection circuit 100 includes a main transistor 10, a reverse current prevention transistor 12, a charge pump circuit 14, an input diode 16, and a control unit 18.

The reverse current prevention transistor 12 and the main transistor 10 are connected in series between the input terminal 102 and the output terminal 104.

The main transistor 10 may be an N-channel MOSFET in this embodiment. The main transistor 10 is a switch to perform switching between interruption and conduction of the DC voltage Vdc, and this turns on when Vdc<Vth, and turns off when Vdc>Vth.

The charge pump circuit 14 and the control unit 18 are provided to control ON/OFF of the main transistor 10. The control unit 18 receives voltage potential difference between the input terminal 102 and the reference voltage terminal 106, i.e. the DC voltage Vdc, and compares the DC voltage Vdc with the threshold voltage Vth. The control unit 18 outputs a control signal Scnt generated according to the comparison result to the charge pump circuit 14. The control signal Scnt becomes high level when Vdc<Vth and low level when Vdc>Vth. The voltage at the connection point N1 of the reverse current prevention transistor 12 and the main transistor 10 is substantially equal to the DC voltage Vdc. Accordingly, the control unit 18 may be composed, for example, of a reference voltage source 18b that generates the threshold voltage Vth, resistors R11 and R12 that divides the voltage at the connection point N1, and a comparator 18a that compares the divided DC voltage Vdc with the threshold voltage Vth.

The charge pump circuit 14 switches on/off of the main transistor 10 according to the level of the control signal Scnt. Specifically, the charge pump circuit 14 turns on the main transistor 10 when the control signal Scnt is at the high level, and turns off the main transistor 10 when the control signal Scnt is at the low level.

The gate voltage Vg1 of the main transistor 10 needs to be set higher than Vdc+Vt in order for the main transistor 10 to output the DC voltage Vdc to the output terminal (source terminal) 104 at the ON state since the main transistor 10 is an N-channel MOSFET. Here, the voltage Vt refers to a gate-source threshold voltage of the main transistor 10.

The charge pump circuit 14 boosts and level-shifts the control signal Scnt to generate the gate voltage Vg1 higher than Vdc+Vt since the DC voltage Vdc is only supplied to the over-voltage protection circuit 100 as power supply.

The input diode 16 is provided between the connection point N1 of the reverse current prevention transistor 12 and the main transistor 10 and the reference voltage terminal 106 in such a direction that the anode becomes the reference voltage terminal 106 side. The input diode 16 may be configured with a parasitic diode or formed on a semiconductor substrate as a dedicated element.

The reverse current prevention transistor 12 is arranged in such a direction that the anode of its body diode D1 becomes the input terminal 102 side. Furthermore, the control terminal (gate) of the reverse current prevention transistor 12 is biased so that the reverse current prevention transistor 12 is turned on in the normal polarity state that the input terminal 102 becomes higher potential and the reference voltage terminal 106 become slower potential. On the contrary, the control terminal (gate) of the reverse current prevention transistor 12 is biased so that the reverse current prevention transistor is turned off in the reverse polarity state that the input terminal 102 becomes lower potential and the reference voltage terminal 106 becomes higher potential.

In a preferred embodiment, the reverse current prevention transistor 12 may be a P-channel MOSFET which is provided between the drain of the main transistor 10 and the input terminal 102. The control terminal (gate) of the reverse current prevention transistor 12 is grounded, a first end (drain) thereof is connected to the input terminal 102, a second end (source) is connected to one end (drain) of the main transistor 10, and the back gate is connected to the second end (source).

Here, the body diode D1 and the input diode 16 are arranged so that their cathodes are opposite to each other on the path that connects the input terminal 102 and the reference voltage terminal 106 to each other.

An operation of the over-voltage protection circuit 100 thusly configured will be described according to the application state of the external power supply 110.

(1) When the DC Voltage Vdc is Applied with a Normal Polarity and a Normal Value In this case, the control signal Scnt becomes high level and the main transistor 10 is turned on since Vdc<Vth. In addition, the voltage Vgs between the gate and the source of the reverse current prevention transistor 12 becomes the DC voltage Vdc itself and the reverse current prevention transistor 12 is turned on since the DC voltage Vdc has the normal polarity. As a consequence, both the reverse current prevention transistor 12 and the main transistor 10 are turned on, and therefore, the DC voltage Vdc applied to the input terminal 102 is output to the charging circuit 112 through the output terminal 104.

(2) When the DC Voltage Vdc is Applied with a Normal Polarity and an Over Voltage In this case, the control signal Scnt becomes low level and the main transistor 10 is turned off since Vdc>Vth. In addition, the voltage Vgs between the gate and the source of the reverse current prevention transistor 12 becomes the DC voltage Vdc itself and the reverse current prevention transistor 12 is turned on since the DC voltage Vdc has the normal polarity. Since the main transistor 10 is turned off, the path between the input terminal 102 and the output terminal 104 is interrupted, and thus, an overvoltage is not supplied to the charging circuit 112.

In addition, when the DC voltage Vdc exceeding the zener voltage Vz (reverse voltage) of the input diode 16 is input, the DC voltage Vdc is clamped to the zener voltage Vz, thus protecting the circuit.

(3) When the DC Voltage Vdc is Applied with a Reverse Polarity (3-a) When the Reverse Current Prevention Transistor 12 is not Provided An operation of the circuit will be described when the reverse current prevention transistor 12 is not provided, that is, the input terminal 102, the cathode of the input diode 16, and one end of the main transistor 10 are connected to one another in order to make clear the operation of the over-voltage protection circuit 100 according to the embodiment.

In this case, the reverse polarity DC voltage Vdc is applied to the reference voltage terminal 106. As a consequence, the DC voltage Vdc is applied across the input diode 16 in the forward direction, and a large current flows across the input diode 16. The flow of the large current across the input diode 16 may not only negatively affect the reliability of the input diode 16 itself but also the reliability of the external power supply 110.

(3-b) When the Reverse Current Prevention Transistor 12 is Provided

Next, an operation of the circuit will be described when the reverse current prevention transistor 12 is provided. When the DC voltage Vdc is applied with a reverse polarity, the voltage Vgs between the gate and the source of the reverse current prevention transistor 12 becomes lower than the threshold voltage Vt and therefore turns off.

At this time, the input diode 16 is provided in the forward direction and the body diode D1 is provided in the reverse direction on the path from the reference voltage terminal 106 to the input terminal 102. Accordingly, the voltage Vdc−Vz obtained by subtracting the zener voltage Vz of the body diode D1 from the DC voltage Vdc is applied across the input diode 16.

The over-voltage protection circuit 100 shown in FIG. 1 may reduce the voltage applied across the input diode 16 compared to where the reverse current prevention transistor 12 is not provided as described in (3-a), thus making it possible to improve the reliability of the input diode 16.

It could be understood by those skilled in the art that the above embodiment is merely an example and therefore various modifications may be made to any combinations of the components or processing steps, which fall within the scope of the present invention.

In the embodiment, MOSFET and bipolar transistor may be properly replaced by each other if necessary. In addition, N-channel MOSFET and P-channel MOSFET or NPN-type bipolar transistor and PNP-type bipolar transistor may be properly replaced by each other.

Figure 2:
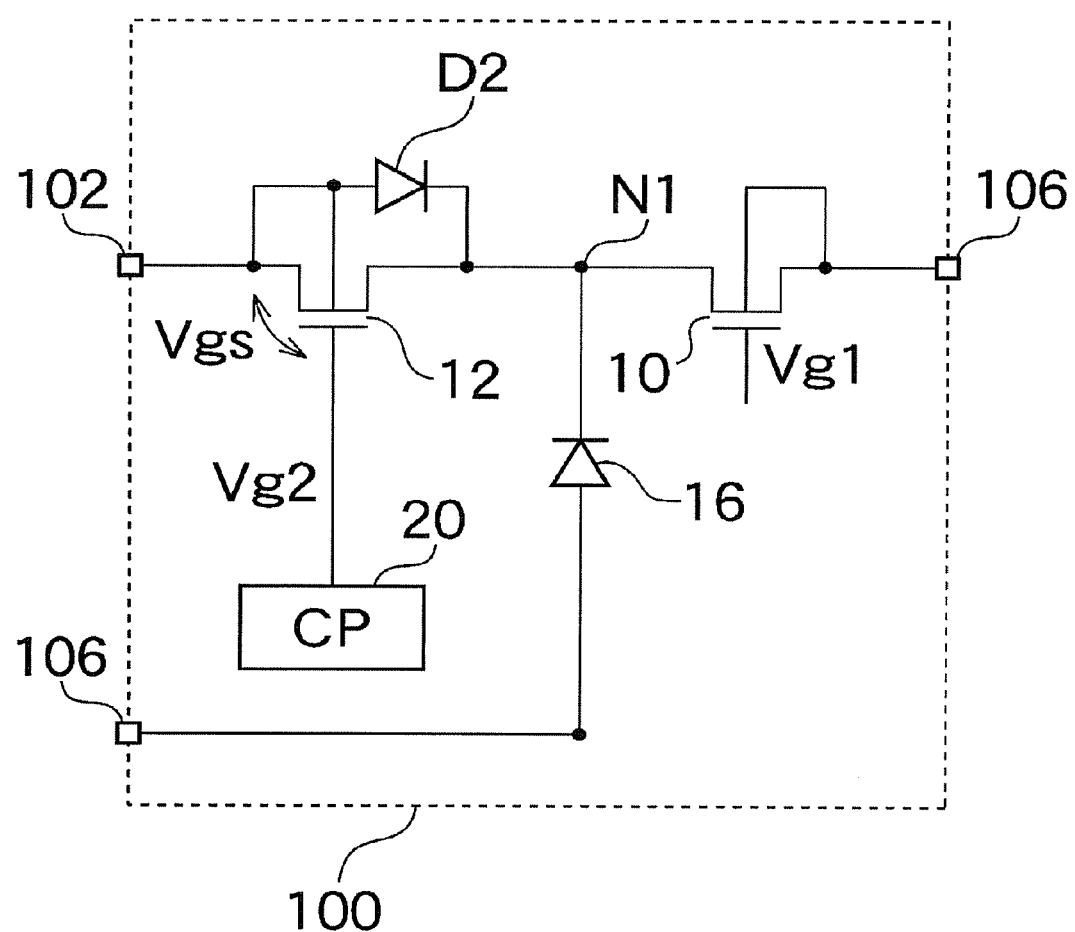
FIG. 2 is a circuit diagram illustrating a partial configuration of a variation to the over-voltage protection circuit shown in FIG. 1.

For instance, the reverse current prevention transistor 12 may be configured as an N-channel MOSFET. FIG. 2 is a circuit diagram illustrating a partial configuration of a variation to the over-voltage protection circuit 100 shown in FIG. 1. FIG. 2 depicts only the reverse current prevention transistor 12 and its peripheral circuits, and the other constructions are the same as those of FIG. 1.

In the variation shown in FIG. 2, a first end (source) of the reverse current prevention transistor 12 is connected to the input terminal 102, a second end (drain) thereof to one end of the main transistor 10, and a back gate thereof to the first end (drain). When the normal DC voltage Vdc is supplied, the control terminal (gate) of the reverse current prevention transistor 12 is applied with the gate voltage Vg2 that is larger than Vdc+Vt by a charge pump circuit 20. In addition, the charge pump circuit 20 does not operate normally when the DC voltage Vdc has a reverse polarity, and therefore, the gate voltage Vg2 becomes 0 V and the reverse current prevention transistor 12 is turned off. Even in the variation shown in FIG. 2, the input diode 16 maybe protected since the cathode of the input diode 16 is opposite to the cathode of the body diode D2 of the reverse current prevention transistor 12 when the DC voltage Vdc is applied with a reverse polarity.

Moreover, the main transistor 10 may be configured as a P-channel MOSFET, or NPN- or PNP-type bipolar transistor.

Even though it has been described in the embodiment that the main transistor 10 is completely turned off in an over-voltage state, on-resistance may be set high so that dropped DC voltage Vdc may be output.

Even though it has been described in the embodiment that the over-voltage protection circuit 100 and the charging circuit 112 are configured as separate ICs, the over-voltage protection circuit 100 and the charging circuit 112 may be integrally configured as a power management IC 116. Otherwise, the over-voltage protection circuit 100 may be also configured using discrete elements.

Furthermore, the setup of high level or low level logic value is merely an example in the embodiment, and may be varied freely by performing an appropriate inversion with an inverter or the like.

While the preferred embodiments of the present invention have been described using specific terms, such description is for illustrative purposes only, and it is to be understood that changes and variations may be made without departing from the spirit or scope of the appended claims.

What is claimed is:

1. An over-voltage protection circuit comprising:
an input terminal that receives a power supply voltage from the external;
an output terminal that outputs the power supply voltage to the external;
a reference voltage terminal that receives a reference voltage;
a reverse current prevention transistor and a main transistor provided in series between the input terminal and the output terminal;
an input diode provided between a connection point of the reverse current prevention transistor and the main transistor and the reference voltage terminal in such a direction that the anode becomes the reference voltage terminal side; and
a control unit that controls the voltage applied to a control terminal of the main transistor according to the power supply voltage, wherein
the reverse current prevention transistor is a P-channel MOSFET (Metal Oxide Semiconductor Field Effect Transistor) arranged in such a direction that the anode of a body diode of the reverse current prevention transistor becomes the input terminal, and a fixed voltage is applied to a control terminal of the reverse current prevention transistor such that the reverse current prevention transistor is biased to be turned on in a normal state that the input terminal becomes high potential and the reference voltage terminal becomes low potential and to be turned off in a reverse polarity state that the input terminal becomes low potential and the reference voltage terminal becomes high potential.

2. The over-voltage protection circuit according to claim 1, wherein
the reverse current prevention transistor has a control terminal connected to the reference voltage terminal such that the fixed voltage is the reference voltage, a first end connected to the input terminal, a second end connected to one end of the main transistor, and a back gate connected to the second end.

3. The over-voltage protection circuit according to claim 1, which is monolithically integrated on a single semiconductor substrate.

4. The over-voltage protection circuit according to claim 1, wherein the main transistor is an N-channel MOSFET and the control circuit comprises a charge pump circuit configured to generate a control voltage and to supply the control voltage to the control terminal of the main transistor, and wherein
the charge pump circuit is active so as to generate the control voltage which makes the main transistor turn on when a voltage according to the power supply voltage is smaller than a predetermined threshold voltage, and wherein
the charge pump circuit is inactive so as to generate the control voltage which makes the main transistor turn off when the voltage according to the power supply voltage is greater than the predetermined threshold voltage.

5. The over-voltage protection circuit according to claim 4, further comprising
a first resistor and a second resistor provided between a connection point of the reverse current prevention transistor and the main transistor and the reference voltage terminal, and wherein
an active and an inactive states of the charge pump circuit is switched according to the voltage at a connection point of the first resistor and the second resistor.

6. An over-voltage protection circuit comprising:
an input terminal that receives a power supply voltage from the external;
an output terminal that outputs the power supply voltage to the external;
a reference voltage terminal that receives a reference voltage;
a reverse current prevention transistor and a main transistor provided in series between the input terminal and the output terminal;
an input diode provided between a connection point of the reverse current prevention transistor and the main transistor and the reference voltage terminal in such a direction that the anode becomes the reference voltage terminal side;
a charge pump circuit configured to supply a bias voltage to a control terminal of the reverse current prevention transistor;
and
a control unit that controls the voltage applied to a control terminal of the main transistor according to the power supply voltage, wherein
the reverse current prevention transistor is an N-channel MOSFET (Metal Oxide Semiconductor Field Effect Transistor) arranged in such a direction that the anode of a body diode of the reverse current prevention transistor becomes the input terminal, and wherein
the charge pump circuit is active so as to generate the bias voltage which is greater than Vdc+Vth, Vdc being the power supply voltage and Vth being a threshold voltage of the MOSFET, such that the reverse current prevention transistor is turned on in a normal state that the input terminal becomes high potential and the reference voltage terminal becomes low potential,
and wherein
the charge pump circuit is inactive so as to generate the bias voltage which is the reference voltage, such that the reverse current prevention transistor is turned off in a reverse polarity state that the input terminal becomes low potential and the reference voltage terminal becomes high potential.

7. The over-voltage protection circuit according to claim 6, which is monolithically integrated on a single semiconductor substrate.

8. A power management circuit comprising:
an over-voltage protection circuit; and a charging circuit that electrically charges a rechargeable battery with a power supply voltage output from the output terminal of the over-voltage protection circuit, wherein
the power management circuit is monolithically integrated, and wherein
the over-voltage protection circuit comprises:
an input terminal that receives a power supply voltage from the external;
an output terminal that outputs the power supply voltage to the external;
a reference voltage terminal that receives a reference voltage;
   a reverse current prevention transistor and a main transistor provided in series between the input terminal and the output terminal;
an input diode provided between a connection point of the reverse current prevention transistor and the main transistor and the reference voltage terminal in such a direction that the anode becomes the reference voltage terminal side; and
a control unit that controls the voltage applied to a control terminal of the main transistor according to the power supply voltage, wherein
the reverse current prevention transistor is a P-channel MOSFET (Metal Oxide Semiconductor Field Effect Transistor) arranged in such a direction that the anode of a body diode of the reverse current prevention transistor becomes the input terminal, and a fixed voltage is applied to a control terminal of the reverse current prevention transistor such that the reverse current prevention transistor is biased to be turned on in a normal state that the input terminal becomes high potential and the reference voltage terminal becomes low potential and to be turned off in a reverse polarity state that the input terminal becomes low potential and the reference voltage terminal becomes high potential.

9. An electronic device comprising:
a rechargeable battery; and
a power management circuit that electrically charges the rechargeable battery with a power supply voltage from the external power supply, the power management circuit comprising:
an over-voltage protection circuit; and
a charging circuit that electrically charges a rechargeable battery with a power supply voltage output from the output terminal of the over-voltage protection circuit, wherein
the power management circuit is monolithically integrated, and wherein
the over-voltage protection circuit comprises:
an input terminal that receives a power supply voltage from the external;
an output terminal that outputs the power supply voltage to the external;
a reference voltage terminal that receives a reference voltage;
   a reverse current prevention transistor and a main transistor provided in series between the input terminal and the output terminal;
an input diode provided between a connection point of the reverse current prevention transistor and the main transistor and the reference voltage terminal in such a direction that the anode becomes the reference voltage terminal side; and
a control unit that controls the voltage applied to a control terminal of the main transistor according to the power supply voltage, wherein
the reverse current prevention transistor is a P-channel MOSFET (Metal Oxide Semiconductor Field Effect Transistor) arranged in such a direction that the anode of a body diode of the reverse current prevention transistor becomes the input terminal, and a fixed voltage is applied to a control terminal of the reverse current prevention transistor such that the reverse current prevention transistor is biased to be turned on in a normal state that the input terminal becomes high potential and the reference voltage terminal becomes low potential and to be turned off in a reverse polarity state that the input terminal becomes low potential and the reference voltage terminal becomes high potential.

10. A power management circuit comprising:
an over-voltage protection circuit; and
a charging circuit that electrically charges a rechargeable battery with a power supply voltage output from the output terminal of the over-voltage protection circuit, wherein
the over-voltage protection circuit comprises:
an input terminal that receives a power supply voltage from the external;
an output terminal that outputs the power supply voltage to the external;
a reference voltage terminal that receives a reference voltage;
   a reverse current prevention transistor and a main transistor provided in series between the input terminal and the output terminal;
an input diode provided between a connection point of the reverse current prevention transistor and the main transistor and the reference voltage terminal in such a direction that the anode becomes the reference voltage terminal side;
a charge pump circuit configured to supply a bias voltage to a control terminal of the reverse current prevention transistor; and
a control unit that controls the voltage applied to a control terminal of the main transistor according to the power supply voltage, wherein
the reverse current prevention transistor is an N-channel MOSFET (Metal Oxide Semiconductor Field Effect Transistor) arranged in such a direction that the anode of a body diode of the reverse current prevention transistor becomes the input terminal, and wherein
the charge pump circuit is active so as to generate the bias voltage which is greater than Vdc+Vth, Vdc being the power supply voltage and Vth being a threshold voltage of the MOSFET, such that the reverse current prevention transistor is turned on in a normal state that the input terminal becomes high potential and the reference voltage terminal becomes low potential,
and wherein
the charge pump circuit is inactive so as to generate the bias voltage which is the reference voltage, such that the reverse current prevention transistor is turned off in a reverse polarity state that the input terminal becomes low potential and the reference voltage terminal becomes high potential.

11. An electronic device comprising:
a rechargeable battery; and a power management circuit that electrically charges the rechargeable battery with a power supply voltage from the external power supply the power management circuit comprising:

an over-voltage protection circuit; and a charging circuit that electrically charges a rechargeable battery with a power supply voltage output from the output terminal of the over-voltage protection circuit, wherein the over-voltage protection circuit comprises:

an input terminal that receives a power supply voltage from the external;

an output terminal that outputs the power supply voltage to the external;

a reference voltage terminal that receives a reference voltage;

a reverse current prevention transistor and a main transistor provided in series between the input terminal and the output terminal;

an input diode provided between a connection point of the reverse current prevention transistor and the main transistor and the reference voltage terminal in such a direction that the anode becomes the reference voltage terminal side;

a charge pump circuit configured to supply a bias voltage to a control terminal of the reverse current prevention transistor;

and a control unit that controls the voltage applied to a control terminal of the main transistor according to the power supply voltage, wherein the reverse current prevention transistor is an N-channel MOSFET (Metal Oxide Semiconductor Field Effect Transistor) arranged in such a direction that the anode of a body diode of the reverse current prevention transistor becomes the input terminal, and wherein the charge pump circuit is active so as to generate the bias voltage which is greater than Vdc+Vth, Vdc being the power supply voltage and Vth being a threshold voltage of the MOSFET, such that the reverse current prevention transistor is turned on in a normal state that the input terminal becomes high potential and the reference voltage terminal becomes low potential, and wherein the charge pump circuit is inactive so as to generate the bias voltage which is the reference voltage, such that the reverse current prevention transistor is turned off in a reverse polarity state that the input terminal becomes low potential and the reference voltage terminal becomes high potential.

* * * * *